United States Patent
Frew et al.

(10) Patent No.: US 9,204,298 B2
(45) Date of Patent: *Dec. 1, 2015

(54) MULTILEVEL AUTHENTICATION

(75) Inventors: David T. Frew, Fort Mill, SC (US); Mark D. Zanzot, Huntersville, NC (US); Tony England, Tega Cay, SC (US); Lisa Gibson, Newnan, GA (US)

(73) Assignee: Bank of America Corporation, Charlotte, NC (US)

(*) Notice: Subject to any disclaimer, the term of this patent is extended or adjusted under 35 U.S.C. 154(b) by 403 days.

This patent is subject to a terminal disclaimer.

(21) Appl. No.: 13/231,208

(22) Filed: Sep. 13, 2011

(65) Prior Publication Data

US 2013/0067551 A1 Mar. 14, 2013

(51) Int. Cl.
*H04W 12/06* (2009.01)
*H04L 9/32* (2006.01)
*G06Q 20/40* (2012.01)
(Continued)

(52) U.S. Cl.
CPC ............... *H04W 12/06* (2013.01); *G06F 21/31* (2013.01); *G06F 21/32* (2013.01); *G06F 21/35* (2013.01); *G06Q 20/20* (2013.01); *G06Q 20/3674* (2013.01); *G06Q 20/40* (2013.01); *H04L 9/32* (2013.01); *H04L 9/321* (2013.01);
(Continued)

(58) Field of Classification Search
CPC ......... G06F 21/32; G06F 21/31; G06F 21/35; G06Q 20/40; G06Q 20/20; G06Q 20/3674; H04L 9/32; H04L 9/3231; H04L 9/321; H04W 12/06
USPC .................... 705/64, 57, 70, 73, 67; 713/186; 382/115–119, 124
See application file for complete search history.

(56) References Cited

U.S. PATENT DOCUMENTS 7,766,223 B1* 8/2010 Mello et al. .................. 235/379
7,774,824 B2* 8/2010 Ross ................................ 726/2
(Continued)

FOREIGN PATENT DOCUMENTS

WO    WO 2010/043722 A1 * 4/2010 ............. G06Q 20/00

OTHER PUBLICATIONS

Kadambi, Kiran S., Jun Li, and Alan H. Karp. "Near-field communication-based secure mobile payment service." Proceedings of the 11th international Conference on Electronic Commerce. (pp. 142-151). ACM, 2009.*

(Continued)

*Primary Examiner* — Kari Schmidt
(74) *Attorney, Agent, or Firm* — Michael A. Springs

(57) ABSTRACT

In an exemplary embodiment, a system includes a memory operable to store a user account identifier associated with a user account and a mobile device identifier associated with a mobile device. The memory is also operable to store a first user credential and a second user credential, the second user credential, wherein the second user credential comprises user input data captured by a sensor. The system includes a network interface operable to receive a request to authenticate a requesting user. The system also includes a processor operable to determine information included in the request to facilitate authentication of the requesting user and whether the information included in the request matches the information associated with the user account. The processor is further operable to authenticate the requesting user if the request is associated with the user account and information included in the request matches the information associated with the user account.

12 Claims, 4 Drawing Sheets

(51) Int. Cl.
  *G06Q 20/20* (2012.01)
  *G06Q 20/36* (2012.01)
  *G06F 21/31* (2013.01)
  *G06F 21/32* (2013.01)
  *G06F 21/35* (2013.01)

(52) U.S. Cl.
  CPC .......... *H04L 9/3215* (2013.01); *H04L 9/3231* (2013.01); *H04L 2209/56* (2013.01)

(56) References Cited

U.S. PATENT DOCUMENTS

| | | | |
|---|---|---|---|
| 7,788,151 B2* | 8/2010 | Pizzi et al. | 705/35 |
| 2001/0032139 A1* | 10/2001 | Debonnett, Jr. | 705/26 |
| 2002/0070273 A1* | 6/2002 | Fujll | 235/382 |
| 2003/0182194 A1* | 9/2003 | Choey et al. | 705/16 |
| 2008/0048026 A1* | 2/2008 | Gangi | G06Q 20/108 235/380 |
| 2008/0172340 A1* | 7/2008 | Karlsson | 705/75 |
| 2008/0209227 A1* | 8/2008 | Venkatesan et al. | 713/186 |
| 2009/0307139 A1* | 12/2009 | Mardikar et al. | 705/67 |
| 2010/0082490 A1* | 4/2010 | Rosenblatt et al. | 705/64 |
| 2010/0325723 A1* | 12/2010 | Essawi et al. | 726/20 |
| 2011/0011931 A1 | 1/2011 | Farley et al. | |
| 2011/0022835 A1* | 1/2011 | Schibuk | 713/153 |
| 2011/0106709 A1* | 5/2011 | Puura | G06Q 20/20 705/64 |
| 2011/0202466 A1* | 8/2011 | Carter | 705/67 |
| 2011/0225090 A1 | 9/2011 | Hammad | |
| 2011/0251892 A1* | 10/2011 | Laracey | G06Q 30/0253 705/14.51 |
| 2011/0314515 A1* | 12/2011 | Hernoud et al. | 726/2 |
| 2012/0157062 A1* | 6/2012 | Kim et al. | 455/414.1 |
| 2012/0240203 A1* | 9/2012 | Kling | 726/5 |
| 2012/0290376 A1* | 11/2012 | Dryer et al. | 705/14.23 |
| 2013/0030933 A1* | 1/2013 | Talach et al. | 705/17 |

OTHER PUBLICATIONS

Hocking, Chris G., et al. "A distributed and cooperative user authentication framework." Information Assurance and Security (IAS), 2010 Sixth International Conference on. (pp. 304-310). IEEE, 2010.*
Patent Pending U.S. Appl. No. 13/231,119 entitled *Multilevel Authentication* in the name of David T. Frew, et al.; 40 total pages, Filed Sep. 13, 2011.
U.S. Patent and Trademark Office, Non-Final Office Action, U.S. Appl. No. 13/231,119, Frew et al., 18 pages, Nov. 6, 2012.
U.S. Patent and Trademark Office, Notice of Allowance and Issue Fees Due, U.S. Appl. No. 13/231,119, Frew et al., 15 pages, Feb. 22, 2013.

* cited by examiner

| | 402 | 404 | 406 | 408 | 410 | |
|---|---|---|---|---|---|---|
| | USER ID | MOBILE DEVICE ID | AUTHENTICATION DEVICE ID | AUTHORIZATION PREFERENCES | USER CREDENTIALS | ... |
| 412a | 001 | 2423 | 56554 | BLUETOOTH FOB | HOUSTON | ... |
| 412b | 002 | 1255 | 76433 | BLUETOOTH HEADSET | password1 | ... |
| 412c | 003 | 4422 | 84433 | RETINAL SCAN | 12345678 | ... |
| 414d | 004 | 4221 | 92323 | ACCELEROMETER L-SHAPE | 0klah0ma | ... |
| | ⋮ | ⋮ | ⋮ | ⋮ | ⋮ | ... |

*FIG. 4*

MULTILEVEL AUTHENTICATION

TECHNICAL FIELD OF THE INVENTION

This invention relates generally to user authentication and, more specifically, to a multilevel authentication system and process for financial transactions.

BACKGROUND OF THE INVENTION

Enterprises handle a large number of customer transactions on a daily basis. New methods of conducting transactions become available as technology advances. For some customers, it may be desirable to conduct transactions using a mobile device, such as a smart phone device. However, if a malicious user gains access to a customer's mobile device, the malicious user may be able to conduct transactions.

SUMMARY OF THE INVENTION

According to embodiments of the present disclosure, disadvantages and problems associated with previous authentication systems may be reduced or eliminated.

In certain embodiments, a system includes a memory, a network interface, and a processor. The memory is operable to store a user account identifier associated with a user account, the user account associated with a user and store a mobile device identifier associated with a mobile device and the user account. The memory is also operable to store a first user credential associated with the user account and store a second user credential, the second user credential associated with the user account, wherein the second user credential comprises user input data, the user input data captured by a sensor associated with the mobile device. The network interface is operable to receive a request to authenticate a requesting user. The processor is communicatively coupled to the memory and the network interface, the memory including executable instructions that upon execution cause the system to determine information included in the request to facilitate authentication of the requesting user and determine whether the information included in the request matches the information associated with the user account. The memory also includes instructions that cause the system to authenticate the requesting user if the request is associated with the user account and information included in the request matches the information associated with the user account.

Particular embodiments of the present disclosure may provide some, none, or all of the following technical advantages. For example, certain embodiments can provide enhanced security for mobile transactions by requiring two levels of authentication. In such embodiments, if a malicious user gains access to a mobile device of a user and correctly guesses the user's user credentials, the malicious user may not be able to complete a transaction due to a second level of authentication. In certain embodiments, a user may be able to use a sensor of a mobile device to add a second level of authentication for enhanced security. In such embodiments, a user may be able to use the sensor to input physical data that is unique to the user, preventing the malicious user from completing a transaction.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

For a more complete understanding of the present disclosure and its advantages, reference is made to the following descriptions, taken in conjunction with the accompanying drawings in which:

FIG. 4 illustrates example multilevel authentication data, which may be utilized by the example system of FIG. 1 to authenticate a user, according to certain embodiments of the present disclosure.

DETAILED DESCRIPTION OF THE INVENTION

Certain embodiments of the present disclosure provide techniques for authenticating a user using multilevel authentication. FIGS. 1 through 4 below illustrate systems and methods for authenticating a user using multilevel authentication.

Figure 1:
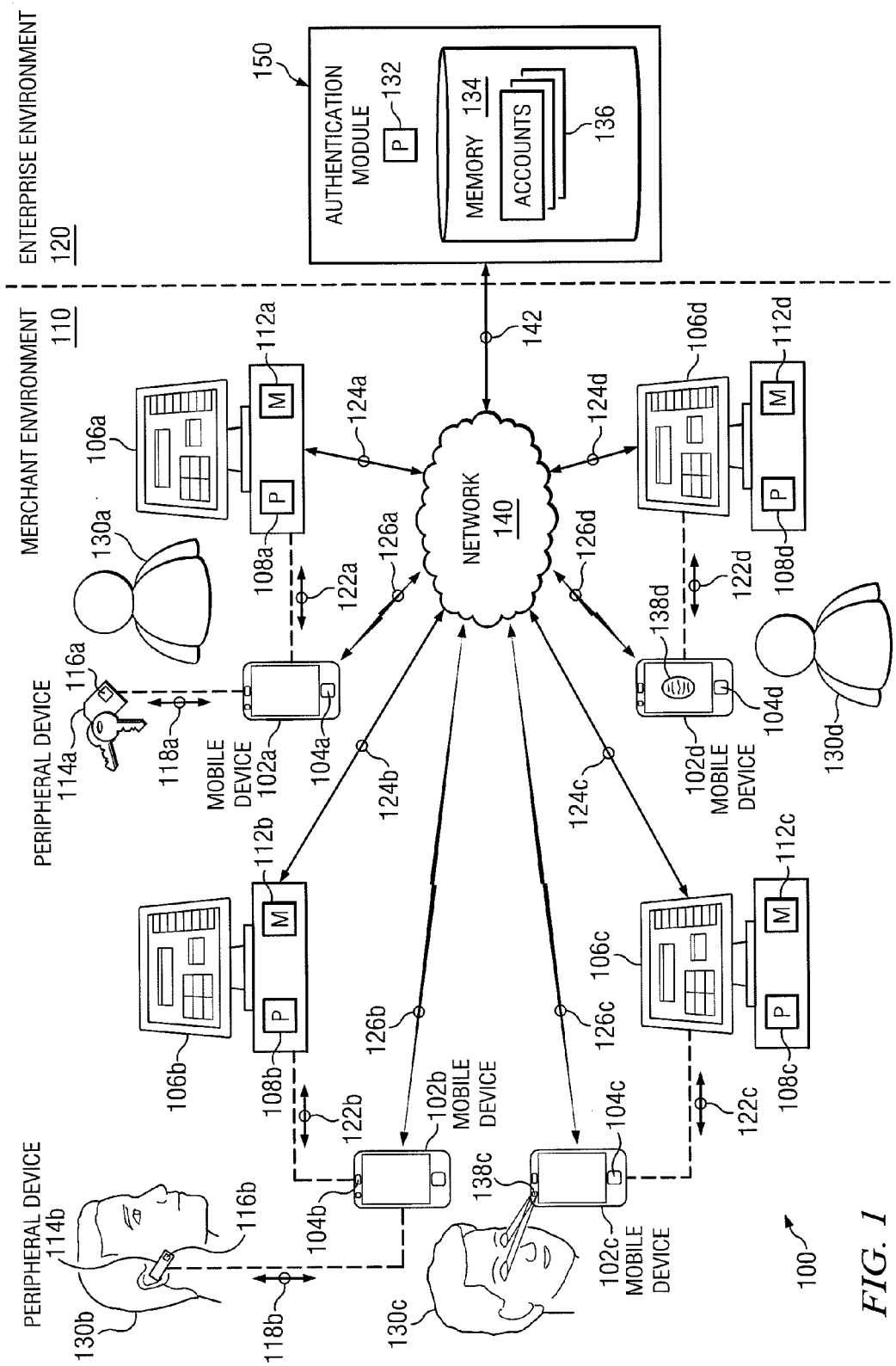
FIG. 1 illustrates an example multilevel authentication system.

FIG. 1 illustrates an example multilevel authentication system 100, according to certain embodiments. In general, multilevel authentication is used by enterprises, such as financial institutions, to authenticate a customer's financial transactions using a smart device. Multilevel authentication may require a customer to use two methods of authentication before the customer is authorized for a particular transaction. For example, the first level may be a password entered into the customer's smart device and the second level may be a check for a particular Bluetooth® device coupled to the smart device. In particular, multilevel authentication system comprises merchant environment 110 and enterprise environment 120.

Merchant environment 110 may be any environment where user 130 may attempt to conduct a transaction that requires authentication. In certain embodiments, merchant environment 110 may comprise mobile devices 102, payment terminals 106, and network 140. Mobile device 102 is a device operable to communicate wirelessly with network 140, payment terminal 106, peripheral device 114, enterprise environment 120, or any other suitable components of multilevel authentication system 100. For example, mobile device 102 may be a laptop computer, personal digital assistant (PDA), cellular phone, tablet, portable media player, smart device, or any other device capable of wireless communication. In certain embodiments, mobile device 102 may include one or more processors, one or more memories, one or more displays, one or more interfaces, one or more components capable of inputting data, one or more components capable of outputting data, one or more components capable of communicating with any other component of multilevel authentication environment 100, or any other component suitable for particular needs.

According to certain embodiments, mobile device 102 may include mobile device identifier 104. Mobile device identifier 104 is a unique identifier for mobile device 102 that allows multilevel authentication system 100 to differentiate a particular mobile device 102 from a different mobile device 102. For example, mobile device identifier 104 may be an alphanumeric string stored in a memory of mobile device 102. In the illustrated example, mobile device 102a may include mobile device identifier 104a and mobile device 102b may include mobile device identifier 104b wherein mobile device identifier 104a is distinct from mobile device identifier 104b. In certain embodiments, mobile device 102 may be operable to communicate with various components of multilevel authentication environment 100 via a short range wireless communications protocol such as Bluetooth®, a near field communications (NFC) protocol, or a radio frequency identification (RFID) protocol.

In certain embodiments, mobile device 102 may include sensor 138. Sensor 138 may be any combination of hardware, software, and/or firmware that can receive physical-based input from user 130 according to particular needs. Sensor 138 may include various components of mobile device 102 or it may be specialized technology providing added functionality to mobile device 102. Sensor 138 may include biometric analysis components or sensor 138 may include other components capable of capturing physical input from user 130. Examples of physical input may include movement of mobile device 102, vocal-recognition of user 130, retinal scanning of user 130, and/or fingerprint analysis of user 130. For example, according to some embodiments, sensor 138 may include one or more accelerometers and/or one or more gyroscopes capable of detecting the motion of mobile device 102 in a particular pattern. In such an embodiment, sensor 138 detects a particular movement of mobile device 102 by user 130. An example of a particular movement is user 130 moving mobile device 102 downwards toward the floor then moving mobile device 102 to the right of user 130, effectively "drawing" an "L shape" in the air with mobile device 102. In such an embodiment, mobile device 102 and/or sensor 138 may be able to compare the input of user 130 to a previously saved user 130 input to authenticate user 130.

Another example of sensor 138 may be ocular-based technology such as a retinal scanner. In such an embodiment, sensor 138 may be able to identify user 130 based on a scan of one or both eyes of user 130. In the illustrated embodiment, mobile device 102c may be able to identify user 130c using sensor 138c, which may include retinal scanning technology. For example, the retinal scanning technology may be software and/or firmware controlling a camera of user device 102c, which is then able to compare the retinal scan to a previous retinal scan to authenticate user 130c. As a further example, sensor 138 may be a fingerprint scanner capable of identifying user 130 based on a scan of the fingerprint of user 130. For example, sensor 138d may include software and/or firmware to use an interactive display of mobile device 130d to receive a fingerprint input from user 130d or sensor 138d may include dedicated hardware to receive a fingerprint input from user 130d. In certain embodiments, mobile device 102 and/or sensor 138d may be able to compare the fingerprint input to a previous fingerprint input from user 130d to authenticate user 130d.

According to certain embodiments, mobile device 102 may be communicatively coupled to peripheral device 114. Generally, peripheral device 114 may be any device that may be communicatively coupled to mobile device 102. For example, peripheral device 114 may be a headset, a microphone, a mouse, a keyboard, a watch, a key fob, an authenticator, a security token, or any other device that may communicatively couple to mobile device 102. In certain embodiments, peripheral device 114 may be any combination of hardware, software, and/or firmware capable of communicatively coupling to mobile device 102. Peripheral device 114 may be issued to user 130 by an enterprise or peripheral device 114 may be a consumer electronic device purchased by user 130 that provides additional functionality to mobile device 102. In certain embodiments, various peripheral devices 114 may be associated with user 130 and/or mobile device 102. For example, user 130 may choose to couple a particular peripheral device 114 to mobile device 102 based on a current location of user 130. In such an embodiment, the second level of authentication for user 130 may vary based on a current location of user 130. Multilevel authentication system 100 is capable of accommodating a large variety and various combinations of peripheral devices 114.

Peripheral device 114 may include peripheral device identifier 116. Peripheral device identifier 116 is a unique identifier for peripheral device 114 that allows multilevel authentication system 100 to differentiate a particular peripheral device 114 from a different peripheral device 114. For example, peripheral device identifier 116 may be an alphanumeric string stored in a memory of peripheral device 114. In the illustrated example, peripheral device 114a may include peripheral device identifier 116a and peripheral device 114b may include peripheral device identifier 116b wherein peripheral device identifier 116a is distinct from peripheral device identifier 116b.

User 130 may be prompted to initiate a transaction at payment terminal 106. Generally, payment terminal 106 may be any device that can receive a payment method from user 130. For example, payment terminal 106 may be a point-of-sale device in a store. Payment terminal 106 may be any combination of hardware, software, and/or firmware capable of prompting user 130 for a payment method for a particular transaction. In certain embodiments, payment terminal 106 may comprise processor 108 and memory 112. Processor 108 may include one or more microprocessors, controllers, or any other suitable computing devices or resources. Processor 108 may work, either alone or with components of multilevel authentication system 100, to provide a portion or all of the functionality of multilevel authentication system 100 described herein. Processor 108 communicatively couples to memory 112. Memory 112 may take the form of volatile or non-volatile memory including, without limitation, magnetic media, optical media, random-access memory (RAM), read-only memory (ROM), removable media, or any other suitable memory component.

In certain embodiments, memory 112 may be internal or external to processor 108 and may include one or more instruction caches or one or more data caches. Instructions in the instruction caches may be copies of instructions in memory 112, and the instruction caches may speed up retrieval of those instructions by processor 108. Data in the data caches may include any suitable combination of copies of data in memory 112 for instructions executing at processor 108 to operate on, the results of previous instructions executed at processor 108 for access by subsequent instructions executing at processor 108, or for writing to memory 112, and other suitable data. The data caches may speed up read or write operations by processor 108.

Generally, user 130 may be prompted for a payment at payment terminal 106. User 130 may use mobile device 102 to make such a payment. In particular, payment terminal 106 may communicate message 122 to mobile device 102. Message 122 may comprise a request for a payment method. In response to message 122, user 130 may input user credentials as a first level of authentication. For example, user credentials may be the user's name, a username, a password, an account name, a personal identification number, a social security number, a credit card number, any combination thereof, or any other information that can authenticate a user 130. Additionally, mobile device 102 may initiate a second level of authentication.

In certain embodiments, mobile device 102 may initiate a second level of authentication by communicating message 118 to peripheral device 114. Message 118 may comprise a request for peripheral device identifier 116. In response to message 118, mobile device 102 may access peripheral device identifier 116 of peripheral device 114. In certain embodiments, in response to message 122, payment terminal 106 may access mobile device identifier 104, peripheral device identifier 116, user credentials entered by user 130 or the result of some function applied to the user credentials, a unique identifier identifying user 130, and/or any other information that may be used by multilevel authentication system 100 to authenticate user 130. In certain embodiments, payment terminal 106 may access information pertaining to the communication protocol coupling peripheral device 114 to mobile device 102.

In the illustrated example, user 130a may be prompted initially for a payment method at payment terminal 106a. Payment terminal 106a may communicate message 122a to mobile device 102a requesting a payment method. In response to message 122a, user 130a may input user credentials, such as a password, as a first level of authentication. Additionally, mobile device 102a may initiate a second level of authentication by communicating message 118a to peripheral device 114a. Message 118a may comprise a request for peripheral device identifier 116a. In response to message 118a, mobile device 102a may access peripheral device identifier 116a of peripheral device 114a. In certain embodiments, in response to message 122a, payment terminal 106a may access mobile device identifier 104a, peripheral device identifier 116a, user credentials entered by user 130a, a unique identifier identifying user 130a, and any other information that may be used by multilevel authentication system 100a to authenticate user 130a.

As another example, user 130b may be prompted initially for a payment method at payment terminal 106b. Payment terminal 106b may communicate message 122b to mobile device 102b requesting a payment method. In response to message 122b, user 130b may input user credentials, such as a password, as a first level of authentication. Additionally, mobile device 102b may initiate a second level of authentication by communicating message 118b to peripheral device 114b. Message 118b may comprise a request for peripheral device identifier 116b. In response to message 118b, mobile device 102b may access peripheral device identifier 116b of peripheral device 114b. In certain embodiments, in response to message 122b, payment terminal 106b may access mobile device identifier 104b, peripheral device identifier 116b, user credentials entered by user 130b, a unique identifier identifying user 130b, and any other information that may be used by multilevel authentication system 100 to authenticate user 130b.

In certain embodiments, mobile device 102 may initiate a second level of authentication requesting input from user 130 via sensor 138. For example, mobile device 102 might use a display of mobile device 102 to instruct user 130 to provide input to mobile device 102 using sensor 138. In response to the prompt, user 130 may provide input to mobile device 102 using sensor 138. In certain embodiments, in response to message 122, payment terminal 106 may access mobile device identifier 104, user credentials entered by user 130, a unique identifier identifying user 130, information about the input of user 130 using sensor 138, and/or any other information that may be used by multilevel authentication system 100 to authenticate user 130.

In the illustrated example, mobile device 102c may initiate a second level of authentication requesting input from user 130c via sensor 138c. Mobile device 102c might use a display of mobile device 102c to instruct user 130c to provide input to mobile device 102c using sensor 138c, which may be capable of conducting a retinal scan. In response to the prompt, user 130c may provide input to mobile device 102c using sensor 138c by placing his or her eyes in position for scanning. In certain embodiments, in response to message 122c, payment terminal 106c may access mobile device identifier 104c, user credentials entered by user 130c, a unique identifier identifying user 130c, information about the input of user 130c using sensor 138c, and/or any other information that may be used by multilevel authentication system 100 to authenticate user 130c.

As another example, mobile device 102d may initiate a second level of authentication requesting input from user 130d via sensor 138d. Mobile device 102d might use a display of mobile device 102d to instruct user 130d to provide input to mobile device 102d using sensor 138d, which may be a fingerprint scanner. In response to the prompt, user 130d may provide input to mobile device 102d using sensor 138d by placing a finger in an appropriate position for scanning. In certain embodiments, in response to message 122d, payment terminal 106d may access mobile device identifier 104d, user credentials entered by user 130d, a unique identifier identifying user 130d, information about the input of user 130d using sensor 138d, and/or any other information that may be used by multilevel authentication system 100 to authenticate user 130d.

Payment terminal 106 may communicate the information accessed from mobile device 102 to authentication module 150 via message 124. In addition to the information accessed from mobile device 102, message 124 may comprise a request to authenticate user 130. In certain embodiments, message 124 may be communicated to authentication module 150 via network 140. For example, payment terminal 106a may communicate message 124a, payment terminal 106b may communicate message 124b, payment terminal 106c may communicate message 124c, and payment terminal 106d may communicate message 124d. Alternatively, mobile device 102 may communicate the same information in message 126 to authentication module 150 via network 140. For example mobile device 102a may communicate message 126a, mobile device 102b may communicate message 126b, mobile device 102c may communicate message 126c, and mobile device 102d may communicate message 126d.

Network 140 facilitates wireless or wireline communication. Network 140 may communicate, for example, IP packets, Frame Relay frames, Asynchronous Transfer Mode cells, voice, video, data, and other suitable information between network addresses. Network 140 may include one or more personal area networks (PANs), local area networks (LANs), a wireless LAN (WLAN), a virtual private network (VPN), radio access networks (RANs), metropolitan area networks (MANs), wide area networks (WANs), mobile networks (e.g., using WiMax (802.16), WiFi (802.11), 3G, or any other suitable wireless technologies in any suitable combination), all or a portion of the global computer network known as the Internet, an extranet, a satellite network, and/or any other communication system or systems at one or more locations, any of which may be any suitable combination of wireless and wireline.

Generally, enterprise environment 120 comprises authentication module 150. Authentication module 150 may authenticate a particular user 130. In certain embodiments, authentication module 150 may include processor 132 and memory 134. Processor 132 may include one or more microprocessors, controllers, or any other suitable computing devices or resources. Processor 132 may work, either alone or with components of multilevel authentication system 100, to provide a portion or all of the functionality of multilevel authentication system 100 described herein. Processor 132 communicatively couples to memory 134. Memory 134 may take the form of volatile or non-volatile memory including, without limitation, magnetic media, optical media, RAM, ROM, removable media, or any other suitable memory component.

In certain embodiments, memory 134 may be internal or external to processor 132 and may include one or more instruction caches or one or more data caches. Instructions in the instruction caches may be copies of instructions in memory 134, and the instruction caches may speed up retrieval of those instructions by processor 132. Data in the data caches may include any suitable combination of copies of data in memory 134 for instructions executing at processor 132 to operate on, the results of previous instructions executed at processor 132 for access by subsequent instructions executing at processor 132, or for writing to memory 134, and other suitable data. The data caches may speed up read or write operations by processor 132.

Authentication module 150 may authenticate user 130 according to any one of a variety of embodiments as required by particular needs. A few example embodiments for authenticating user 130 are disclosed in the following paragraphs. Particularly, in response to message 124, authentication module 150 utilizes processor 132 and memory 134 to initiate the authentication of user 130. Using the information included in message 124, authentication module 150 may retrieve a particular user account 136 from user accounts 136. For example, authentication module 150 may use the unique identifier of user 130 to retrieve a particular user account 136. In certain embodiments, user accounts 136 may be stored in memory 134. In certain embodiments user accounts 136 may be stored in one or more text files, tables in a relational database, or any other suitable data structure capable of storing information. Each user account 136 may be associated with a user 130. In certain embodiments, user account 136 may contain information that authentication module 150 may use to compare against the information included in message 124. For example, user account 136 may include a unique identifier for user 130, mobile device identifier 104, peripheral device identifier 116, an identifier for sensor 138, user input from sensor 138, authorization preferences for user 130, user credentials or a result of some function applied to user credentials, and/or any other information useful for authenticating user 130.

Authentication module 150 may compare the user credentials included in message 124 against the user credentials contained in the particular user account 136. If the user credentials of message 124 do not match the user credentials included in the particular user account 136, authentication module 150 may communicate message 142 over network 140 to payment terminal 106 and/or mobile device 102. Message 142 may contain an indication that authentication of user 130 has failed. It should be understood when a user credential is discussed in any particular embodiment, the user credential may be the actual user credential or it may be a result of some function(s) applied to the user credential. Multilevel authentication system 100 is capable of storing, accessing, communicating, comparing, and/or processing user credentials (and derivatives thereof) in any suitable format according to particular needs. For example, authentication module 150 may compare the actual user credentials or authentication module 150 may compare a hash value of the user credentials in the particular user account 136 with a hash value of the user credentials included in message 124.

Authentication module 150 may also compare mobile device identifier 104 included in message 124 with mobile device identifier 104 of user account 136. If mobile device identifier 104 included in message 124 does not match mobile device identifier 104 included in user account 136, authentication module 150 may communicate message 142 over network 140 to payment terminal 106 and/or mobile device 102. Message 142 may contain an indication that authentication of user 130 has failed.

In certain embodiments, authentication module 150 may compare peripheral device identifier 104 included in message 124 to peripheral device identifier 104 included in user account 136. If peripheral device identifier 116 included in message 124 does not match peripheral device identifier 116 included in user account 136, authentication module 150 may communicate message 142 over network 140 to payment terminal 106 and/or mobile device 102. Message 142 may contain an indication that authentication of user 130 has failed. This may be because the particular peripheral device 114 that is associated with user account 136 is not coupled to mobile device 102.

In certain embodiments, if user credentials of message 124 match the user credentials contained in the particular user account 136, mobile device identifier 104 of message 124 matches mobile device identifier 104 of the particular user account 136, and peripheral device identifier 116 of message 124 matches peripheral device identifier 116 of the particular user account 136, then authentication module 150 may determine user 130 is authenticated. Authentication module 150 may communicate message 142 to mobile device 102 and/or payment terminal 106 indicating that user 130 is authenticated. Once user 130 is authenticated, then user 130 may proceed with the current transaction.

According to certain embodiments, message 124 may contain a result of the comparison between the input of user 130 into sensor 138 of mobile device 102 to a previously saved user 130 input into sensor 138 of mobile device 102. The result of the comparison may be that the two inputs match or are similar enough to verify user 130 or that the two inputs do match or are not similar enough to verify user 130 or any other suitable result of a comparison between the two inputs according to particular needs. In such embodiments, if user credentials of message 124 match the user credentials contained in the particular user account 136, mobile device identifier 104 of message 124 matches mobile device identifier 104 of the particular user account 136, and the result of the user input comparison verifies user 130, then authentication module 150 may determine user 130 is authenticated. Authentication module 150 may communicate message 142 to mobile device 102 and/or payment terminal 106 indicating that user 130 is authenticated. Once user 130 is authenticated, then user 130 may proceed with the current transaction.

In certain embodiments, user account 136 may include previously saved user 130 input into sensor 138 of mobile device 102. In such embodiments, message 124 may contain the input of user 130 into sensor 138 of mobile device 102. The input of user 130 into sensor 138 may be in any suitable format according to particular needs. Authentication module 150 may compare the input of user 130 included in message 124 against the previously saved user 130 input into sensor 138 of mobile device 102. If the two inputs do not match or are not similar enough to verify user 130, then authentication module 150 may communicate message 142 over network 140 to payment terminal 106 and/or mobile device 102. Message 142 may contain an indication that authentication of user 130 has failed. If user credentials of message 124 match the user credentials contained in the particular user account 136, mobile device identifier 104 of message 124 matches mobile device identifier 104 of the particular user account 136, and the two user inputs match or are similar enough to verify user 130, then authentication module 150 may determine user 130 is authenticated. Authentication module 150 may communicate message 142 to mobile device 102 and/or payment terminal 106 indicating that user 130 is authenticated. Once user 130 is authenticated, then user 130 may proceed with the current transaction.

Any component of multilevel authentication system 100 may include an interface, logic, memory, and other suitable elements. An interface receives input, sends output, processes the input and/or output and/or performs other suitable operations. An interface may comprise hardware and/or software. Logic performs the operation of the component, for example, logic executes instructions to generate output from input. Logic may include hardware, software, and/or other logic. Logic may be encoded in one or more non-transitory media, such as a computer-readable medium or any other suitable tangible medium, and may perform operations when executed by a computer. Certain logic, such as a processor, may manage the operation of a component. Examples of a processor include one or more computers, one or more microprocessors, one or more applications, and/or other logic. Any suitable logic may perform the functions of multilevel authentication system 100.

Certain embodiments of the present disclosure may provide some, none, or all of the following technical advantages. For example, certain embodiments can provide enhanced security for mobile transactions by requiring two levels of authentication. In such embodiments, if a malicious user gains access to mobile device 102 of user 130 and correctly guesses user credentials of user 130, the malicious user may not be able to complete a transaction due to a second level of authentication. In certain embodiments, user 130 may be able to use peripheral device 114 to add a second level of authentication for enhanced security. In such embodiments, user 130 may be able to use peripheral device 114 to add functionality to mobile device 102 other than security. According to certain embodiments, sensor 138 may provide a second level of authentication that is based on a unique characteristic of user 130. In such embodiments, security is enhanced because a malicious user may possess user credentials and mobile device 102 of user 130, but not the unique characteristics of user 130 required to authenticate user 130.

Figure 2:
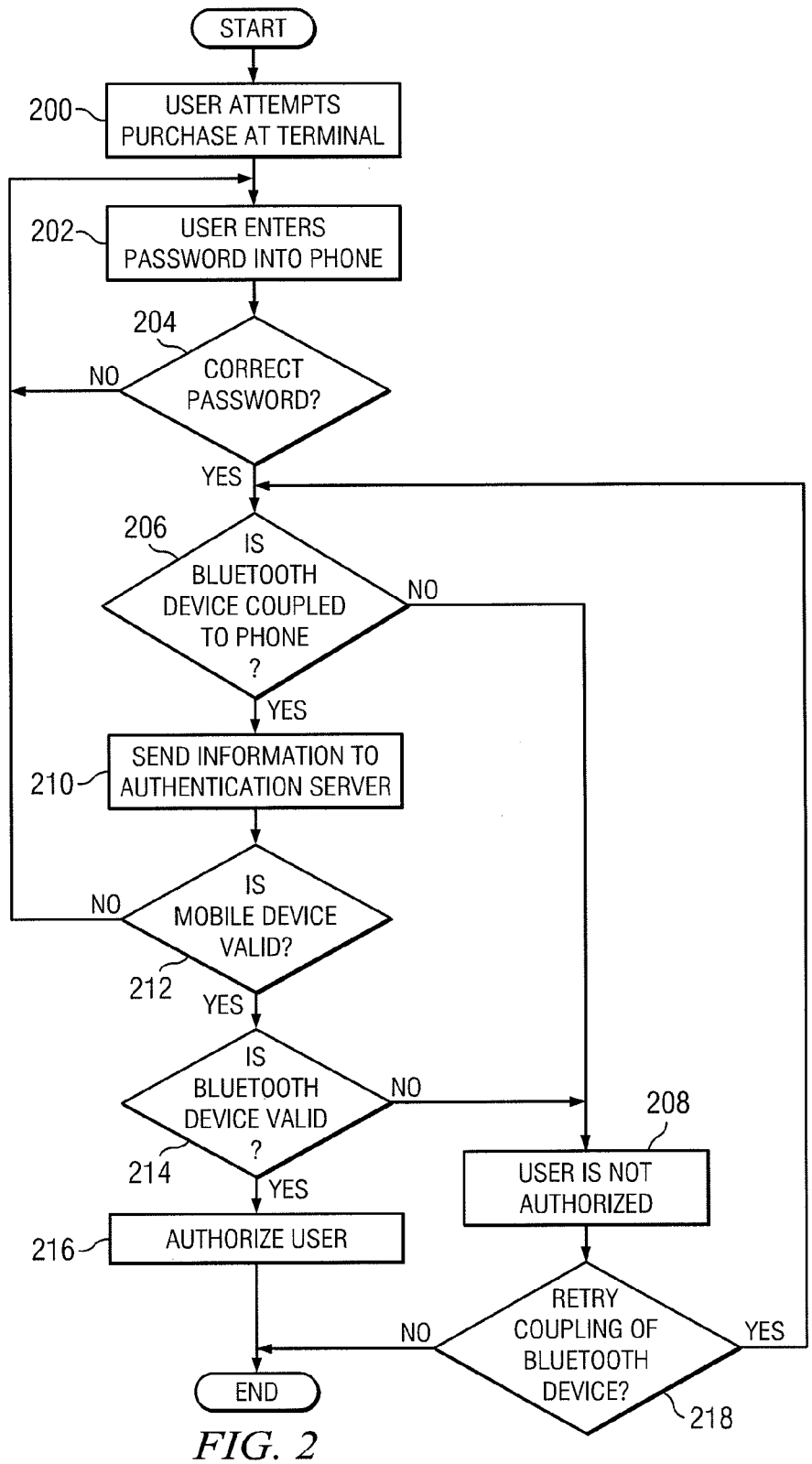
FIG. 2 illustrates an example method for multilevel authentication, which may be performed by the example system of FIG. 1 to authenticate a user, according to certain embodiments of the present disclosure.

FIG. 2 illustrates an example multilevel authentication method to be performed by the example system 100 of FIG. 1 according to certain embodiments of a present disclosure. The method may be implemented in any suitable combination of software, firmware, and hardware. Although particular components may be identified as performing particular steps, the present disclosure contemplates any suitable components performing the steps according to particular needs.

At step 200, user 130 may attempt a transaction at payment terminal 106. For example, user 130 may initiate a purchase at payment terminal 106. User 130 may be prompted for a payment at payment terminal 106. User 130 may use mobile device 102 to make such a payment. In certain embodiments, payment terminal 106 may communicate message 122 to mobile device 102. Message 122 may comprise a request for a payment method. At step 202, in response to message 122, user 130 may input user credentials as a first level of authentication. For example, user credentials may be the user's name, a username, a password, an account name, a personal identification number, a social security number, a credit card number, any combination thereof, or any other information that can authenticate a user 130.

At step 204, multilevel authentication system 100 may determine whether the user credentials entered by user 130 into mobile device 102 are correct. The validity of the user credentials may be determined at mobile device 102, sales terminal 106, authentication module 150, or any other suitable component of multilevel authentication system 100. If the user credentials are incorrect, then the example method may return to step 202. If the user credentials are correct, then the example method may proceed to step 206.

At step 206, multilevel authentication system 100 may determine whether peripheral device 114 is coupled to mobile device 102. For example, mobile device 102 may determine whether peripheral device 114, such as a Bluetooth® device, is coupled to mobile device 102. If peripheral device 114 is not coupled to mobile device 102, then the example method may proceed to step 208. If multilevel authentication system 100 determines peripheral device 114 is coupled to mobile device 102, then the example method may proceed to step 210.

At step 208, user 130 is denied authorization and the example method may proceed to step 218. At step 218, multilevel authentication system 100 may query user 130 to determine if user 130 desires to retry the coupling of peripheral device 114. If user 130 decides to retry the coupling of peripheral device 114, the example method may proceed to step 206. Otherwise, the example method may conclude.

At step 210, payment terminal 106 may access mobile device identifier 104, peripheral device identifier 116, user credentials entered by user 130, a unique identifier identifying user 130, and/or any other information that may be used by multilevel authentication system 100 to authenticate user 130. In certain embodiments, payment terminal 106 may access information pertaining to the communication protocol coupling peripheral device 114 to mobile device 102. Payment terminal 106 may communicate the information accessed from mobile device 102 to authentication module 150 via message 124. In addition to the information accessed from mobile device 102, message 124 may comprise a request to authenticate user 130. In certain embodiments, message 124 may be communicated to authentication module 150 via network 140. Alternatively, mobile device 102 may communicate the same information in message 126 to authentication module 150 via network 140. The example method may then proceed to step 212.

At step 212, in response to message 124, authentication module 150 facilitates communication between processor 132 and memory 134 to initiate the authentication of user 130. Using the information included in message 124, authentication module 150 may retrieve a particular user account 136 from user accounts 136. For example, authentication module 150 may use the unique identifier of user 130 to retrieve a particular user account 136. According to some embodiments, user accounts 136 may be stored in memory 134. In some embodiments, user accounts 136 may be stored in one or more text files, tables in a relational database, or any other suitable data structure capable of storing information. Each user account 136 may be associated with a user 130. User account 136 may contain information that authentication module 150 may use to compare against the information included in message 124. For example, user account 136 may include a unique identifier for user 130, mobile device identifier 104, peripheral device identifier 116, an identifier for sensor 138, user input from sensor 138, authorization preferences for user 130, user credentials, and/or any other information useful for authenticating user 130. Authentication module 150 may compare mobile device identifier 104 included in message 124 with mobile device identifier 104 of user account 136. If mobile device identifier 104 included in message 124 does not match mobile device identifier 104 included in user account 136, authentication module 150 may deny authentication of user 130 and the example method may proceed to step 202. If mobile device identifier 104 included in message 124 matches mobile device identifier 104 included in user account 136, the example method may proceed to step 214.

At step 214, authentication module 150 may compare peripheral device identifier 116 included in message 124 to peripheral device identifier 116 included in user account 136. If peripheral device identifier 116 included in message 124 does not match peripheral device identifier 116 included in user account 136, authentication module 150 may proceed to step 208. If peripheral device identifier 116 included in message 124 matches peripheral device identifier 116c included in user account 136, the example method may proceed to step 216. At step 216, authentication module 150 may communicate message 142 to mobile device 102 and/or payment terminal 106 indicating that user 130 is authenticated. Once user 130 is authenticated, then user 130 may proceed with the current transaction.

Figure 3:
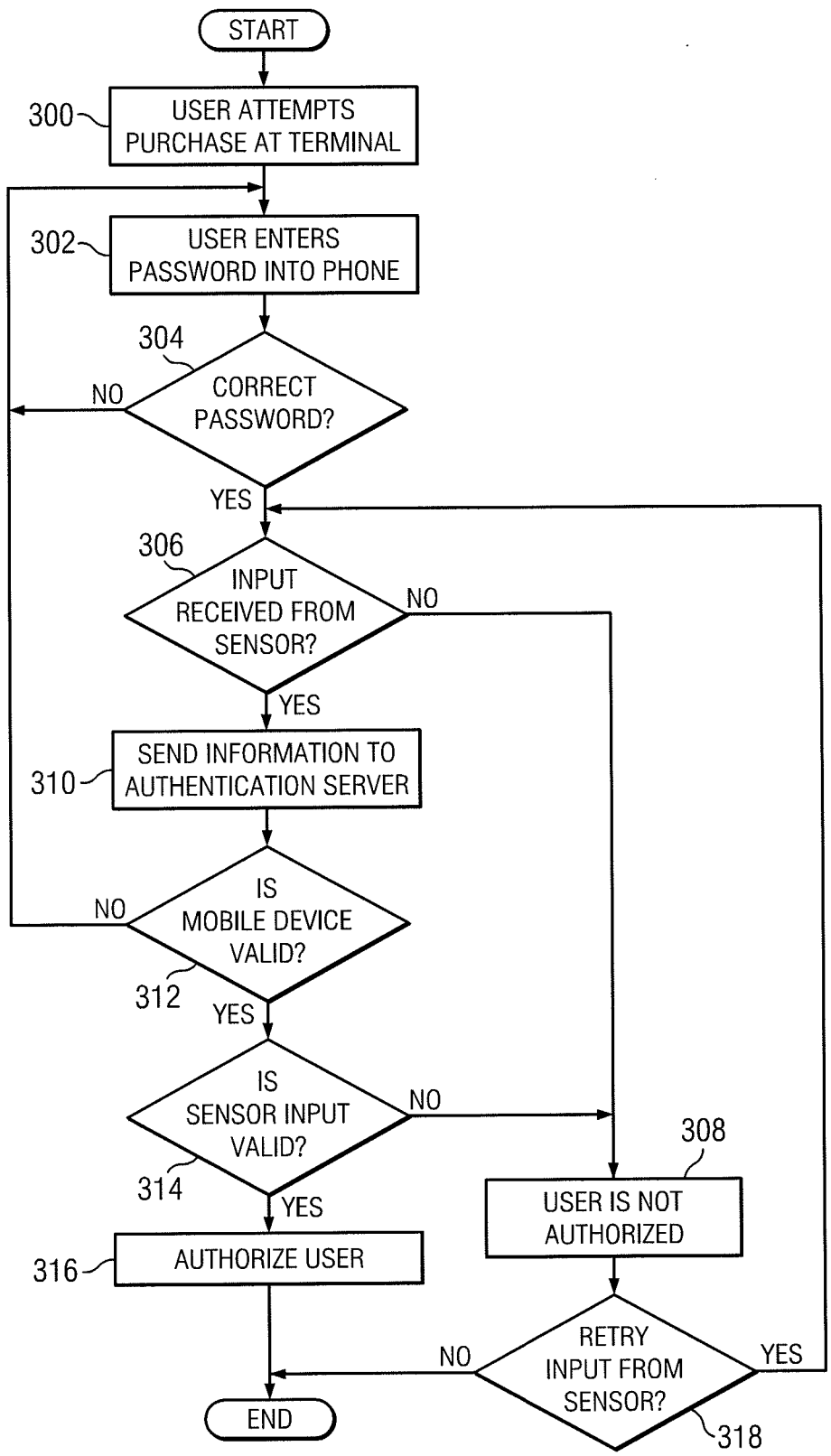
FIG. 3 illustrates an example method for multilevel authentication, which may be performed by the example system of FIG. 1 to authenticate a user, according to certain embodiments of the present disclosure.

FIG. 3 illustrates an example multilevel authentication method to be performed by the example system 100 of FIG. 1 according to certain embodiments of a present disclosure. The method may be implemented in any suitable combination of software, firmware, and hardware. Although particular components may be identified as performing particular steps, the present disclosure contemplates any suitable components performing the steps according to particular needs.

At step 300, user 130 may attempt a transaction at payment terminal 106. For example, user 130 may initiate a purchase at payment terminal 106. User 130 may be prompted for a payment at payment terminal 106. User 130 may use mobile device 102 to make such a payment. Payment terminal 106 may communicate message 122 to mobile device 102. Message 122 may comprise a request for a payment method. At step 302, in response to message 122, user 130 may input user credentials as a first level of authentication. For example, user credentials may be the user's name, a username, a password, an account name, a personal identification number, a social security number, a credit card number, any combination thereof, or any other information that can authenticate a user 130.

At step 304, multilevel authentication system 100 may determine whether the user credentials entered by user 130 into mobile device 102 are correct. The validity of the user credentials may be determined at mobile device 102, sales terminal 106, authentication module 150, or any other suitable component of multilevel authentication system 100. If the user credentials are incorrect, then the example method may return to step 302. If the user credentials are correct, then the example method may proceed to step 306.

At step 306, multilevel authentication system 100 may determine whether input from user 130 has been received by sensor 138 of mobile device 102. If no input has been received by sensor 138, then the example method may proceed to step 308. If multilevel authentication system 100 determines that sensor 138 received input from user 130, then the example method may proceed to step 310.

At step 308, user 130 is denied authorization and the example method may proceed to step 318. At step 318, multilevel authentication system 100 may query user 130 to determine if user 130 desires to retry entering input into sensor 138 of mobile device 102. If user 130 decides to retry entering input into sensor 138 of mobile device 102, the example method may proceed to step 306. Otherwise, the example method may conclude.

At step 310, payment terminal 106 may access mobile device identifier 104, user credentials entered by user 130, a unique identifier identifying user 130, information about the input of user 130 using sensor 138, and/or any other information that may be used by multilevel authentication system 100 to authenticate user 130. According to some embodiments, payment terminal 106 may communicate the information accessed from mobile device 102 to authentication module 150 via message 124. In addition to the information accessed from mobile device 102, message 124 may comprise a request to authenticate user 130. In certain embodiments, message 124 may be communicated to authentication module 150 via network 140. Alternatively, mobile device 102 may communicate the same information in message 126 to authentication module 150 via network 140. The example method may then proceed to step 312.

At step 312, in response to message 124, authentication module 150 facilitates communication between processor 132 and memory 134 to initiate the authentication of user 130. Using the information included in message 124, authentication module 150 may retrieve a particular user account 136 from user accounts 136. For example, authentication module may use the unique identifier of user 130 to retrieve a particular user account 136. In certain embodiments, user accounts 136 may be stored in memory 134. User accounts 136 may be stored in one or more text files, tables in a relational database, or any other suitable data structure capable of storing information. Each user account 136 may be associated with a user 130. User account 136 may contain information that authentication module 150 may use to compare against the information included in message 124. For example, user account 136 may include a unique identifier for user 130, mobile device identifier 104, peripheral device identifier 116, an identifier for sensor 138, user input from sensor 138, authorization preferences for user 130, user credentials, and/or any other information useful for authenticating user 130. Authentication module 150 may compare mobile device identifier 104 included in message 124 with mobile device identifier 104 of user account 136. If mobile device identifier 104 included in message 124 does not match mobile device identifier 104 included in user account 136, authentication module 150 may deny authentication of user 130 and the example method may proceed to step 302. If mobile device identifier 104 included in message 124 matches mobile device identifier 104 included in user account 136, the example method may proceed to step 314.

At step 314, user account 136 may include previously saved user 130 input into sensor 138 of mobile device 102. In such embodiments, message 124 may contain the input of user 130 into sensor 138 of mobile device 102. The input of user 130 into sensor 138 may be in any suitable format according to particular needs. Authentication module 150 may compare the input of user 130 included in message 124 against the previous saved user 130 input into sensor 138 of mobile device 102. If the two inputs do not match or are not similar enough to verify user 130, then the example method may proceed to step 308. If the two user inputs match or are similar enough to verify user 130, then the example method may proceed to step 316. At step 316, authentication module 150 may communicate message 142 to mobile device 102 and/or payment terminal 106 indicating that user 130 is authenticated. Once user 130 is authenticated, then user 130 may proceed with the current transaction.

FIG. 4 illustrates example multilevel authentication data, which may be utilized by the example system of FIG. 1 to authenticate a user, according to certain embodiments of the present disclosure. An example data set of FIG. 4 is multilevel authentication data 400, which represents multilevel authentication data stored for various users 130 and used by authentication module 150 to authenticate users 130. It should be understood that multilevel authentication data 400 is provided for example purposes only. The example multilevel authentication data 400 will be described with reference to example multilevel authentication system 100. Multilevel authentication data 400 is depicted as having a tabular structure for illustrative purposes only. Multilevel authentication data 400 can be stored in a text file, a table in a relational database, a spreadsheet, a hash table, a linked list, or any other suitable data structure capable of storing information. Each entry in multilevel authentication data 400 may or may not be assigned a unique identifier. It should be noted that although only clear text values readable by humans are shown in multilevel authentication data 400, multilevel authentication system 100 is capable of accommodating a variety of formatted data values including encrypted data values for increased security. In certain embodiments, multilevel authentication data 400 may be stored as part of accounts 136 in memory 134.

Generally, multilevel authentication data 400 contains various details about users 130 that authentication module 150 may use to authenticate user 130. For example, multilevel authentication data 400 may contain user identifier 402, mobile device identifier 404, authentication device identifier 406, authorization preferences 408, and user credentials 410. Records 412 are example entries of multilevel authentication data 400. In some embodiments, each record 412 corresponds to a particular user 130. In other embodiments, a particular user 130 may have multiple corresponding records 412 representing a variety of multilevel authentication options. Although four records 412 are illustrated, multilevel authentication data 400 may contain as many or as few records 412 required to fulfill particular needs. Similarly, although only five data elements, depicted in the current example as columns, are shown in multilevel authentication data 400, multilevel authentication data 400 may contain as many or as few data elements as required to fulfill particular needs.

User identifier 402 may represent a unique identifier of a particular user 130. For example, user identifier 402 may be a number, a string of alphabetical characters, a string of alphanumeric characters, or any other data type capable of identifying a particular user 130. In the illustrated example, user identifier 402 is an integer. For example, record 412a is associated with a particular user 130 with user identifier 402 of "001," record 412b is associated with a particular user 130 with user identifier 402 of "002," record 412c is associated with a particular user 130 with user identifier 402 of "003," and record 412d is associated with a particular user 130 with user identifier 402 of "004."

Mobile device identifier 404 may represent a unique identifier of a particular mobile device 102. For example, mobile device identifier 404 may be a number, a string of alphabetical characters, a string of alphanumeric characters, or any other data type capable of identifying a particular mobile device 102. In certain embodiments, mobile device identifier 404 of a particular mobile device 102 may correspond to mobile device identifier 104 of the particular mobile device 102. In the illustrated example, mobile device identifier 404 is an integer. For example, record 412a is associated with a particular mobile device 102 with mobile device identifier 404 of "2423," record 412b is associated with a particular mobile device 102 with mobile device identifier 404 of "1255," record 412c is associated with a particular mobile device 102 with mobile device identifier 404 of "4422," and record 412d is associated with a particular mobile device 102 with mobile device identifier 404 of "4221."

Authentication device identifier 406 may represent a unique identifier of a particular authentication device. For example, authentication device identifier 406 may correspond to peripheral device identifier 116 or an identifier associated with sensor 138 of mobile device 102. Authentication device identifier 406 may be a number, a string of alphabetical characters, a string of alphanumeric characters, or any other data type capable of identifying a particular authentication device. In the illustrated example, authentication device identifier 406 is an integer. For example, record 412a is associated with an authentication device identifier 406 of "56554," record 412b is associated with an authentication device identifier 406 of "76433," record 412c is associated with an authentication device identifier 406 of "84433," and record 412d is associated with an authentication device identifier 406 of "92323."

Authorization preferences 408 may represent information regarding the multilevel authentication preferences of user 130. For example, authorization preferences 408 may contain information about peripheral device 114, sensor 138, previously stored input from user 130 into sensor 138, required input from sensor 138, and/or any other information that would be suitable for multilevel authentication according to particular needs. Authorization preferences 408 may be stored in any data format or data structure suitable for particular needs. In the illustrated example, authorization preferences 408 are stored in a human-readable clear text format for illustrative purposes. For example, record 412a includes authorization preferences 408 of "BLUETOOTH FOB," which may provide information regarding peripheral device 114 to multilevel authentication system 100 such as peripheral device 114 may be a security device issued by an enterprise. Record 412b includes authorization preferences 408 of "BLUETOOTH HEADSET," which may provide information regarding peripheral device 114 to multilevel authentication system 100 such as peripheral device 114 may be a consumer electronic device. Record 412c includes authorization preferences 408 of "RETINAL SCAN," which may provide information about sensor 138 to multilevel authentication system 100. In this example, "RETINAL SCAN" may signify that sensor 138 of mobile device 102 is capable of conducting a retinal scan of user 130. In certain embodiments, authorization preferences 408 may include data previously inputted into sensor 138, signifying a correct retinal scan, by user 130 that multilevel authentication system 100 may compare against when authenticating user 130. Record 412d includes authorization preferences 408 of "ACCELEROMETER L-SHAPE," which may provide information about sensor 138 to multilevel authentication system 100. In this example, "ACCELEROMETER L-SHAPE" may signify that sensor 138 of mobile device 102 is capable of functioning as a motion-detecting accelerometer and that user 130 must "wave" mobile device 102 in an "L" shape to be authenticated. In certain embodiments, authorization preferences 408 may include data previously inputted into sensor 138, signifying a correct movement of mobile device 102, by user 130 that multilevel authentication system 100 may compare against when authenticating user 130.

User credentials 410 may represent a correct user credential that user 130 may enter to gain a first level of authentication. For example, user credentials 410 may be the user's name, a username, a password, an account name, a personal identification number, a social security number, a credit card number, any combination thereof, or any other information that can authenticate a user 130. Multilevel authentication system 100 may compare an entered user credential against user credentials 410 to determine if user 130 passes a first level of authentication. In the illustrated example, record 412a includes user credentials 410 of "HOUSTON," record 412b includes user credentials 410 of "password1," record 412c includes user credentials 410 of "12345678," and record 414d includes user credentials 410 of "OklahOma."

Although the present disclosure describes or illustrates particular operations as occurring in a particular order, the present disclosure contemplates any suitable operations occurring in any suitable order. Moreover, the present disclosure contemplates any suitable operations being repeated one or more times in any suitable order. Although the present disclosure describes or illustrates particular operations as occurring in sequence, the present disclosure contemplates any suitable operations occurring at substantially the same time, where appropriate. Any suitable operation or sequence of operations described or illustrated herein may be interrupted, suspended, or otherwise controlled by another process, such as an operating system or kernel, where appropriate. The acts can operate in an operating system environment or as stand-alone routines occupying all or a substantial part of the system processing.

Although the present disclosure has been described with several embodiments, diverse changes, substitutions, variations, alterations, and modifications may be suggested to one skilled in the art, and it is intended that the disclosure encompass all such changes, substitutions, variations, alterations, and modifications as fall within the spirit and scope of the appended claims.

What is claimed is:

1. An authentication method, comprising:
    storing user information associated with a user account of a user, the user information comprising:
        a user account identifier associated with the user account;
        a mobile device identifier associated with a mobile device and the user account;
        a peripheral device identifier associated with a peripheral device communicatively coupled to the mobile device;
        a first user credential associated with the user account; and
        a second user credential, the second user credential associated with the user account, wherein the second user credential comprises user input data, the user input data captured by a sensor associated with the mobile device;
    receiving, from a payment terminal, a request to authenticate a financial transaction associated with a requesting user, wherein the request comprises:
        a requesting user account identifier;
        a requesting mobile device identifier, the requesting mobile device identifier associated with a requesting mobile device;
        a requesting peripheral device identifier, the requesting peripheral device identifier communicated from the peripheral device communicatively coupled to the mobile device;
        a first requesting user credential; and
        a second requesting user credential, the second requesting user credential comprising requesting user input data, the requesting user input data captured by a requesting sensor associated with the requesting mobile device;
    identifying, by a processor, information included in the request to facilitate authentication of the requesting user, wherein at least a portion of the information included in the request from the payment terminal obtained from a mobile device of the requesting user;
    determining, by the processor, that the information included in the request matches the user information associated with the user account, wherein determining that the information included in the request matches the user information associated with the user account comprises comparing the requesting user account identifier to the user account identifier, comparing the requesting mobile device identifier to the mobile device identifier, comparing the requesting peripheral device identifier to the peripheral device identifier, comparing a hash value of the first user credential to a hash value of the first requesting user credential, and comparing the second requesting user credential to the second user credential; and
    authenticating, by the processor, the requesting user in response to determining that the information included in the request matches the user information associated with the user account; and
    communicating a message to the payment terminal indicating that the requesting user is authenticated for the financial transaction in response to authenticating the requesting user.

2. The method of claim 1, wherein the sensor is a selected one of the following:
    a retinal scanner;
    a fingerprint scanner;
    a motion sensor; or
    a vocal sensor.

3. The method of claim 1, wherein the sensor is a biometric device.

4. The method of claim 1, wherein the sensor is configured to detect a movement of the mobile device according to a spatial pattern.

5. The method of claim 1, wherein the user input data is a selected one of the following:
    retinal scan data of the user;
    fingerprint scan data of the user;
    movement data of the mobile device; or
    vocal data of the user.

6. The method of claim 1, wherein the second user credential is associated with a geographical location of the mobile device.

7. An authentication system comprising:
    a memory configured to store user information associated with a user of a user, the user information comprising:
        a user account identifier associated with a user account;
        a mobile device identifier associated with a mobile device and the user account;
        a peripheral device identifier associated with a peripheral device communicatively coupled to the mobile device;
        a first user credential associated with the user account; and
        a second user credential, the second user credential associated with the user account, wherein the second user credential comprises user input data, the user input data captured by a sensor associated with the mobile device;

a network interface configured to receive, from a payment terminal, a request to authenticate a financial transaction associated with a requesting user, wherein the request comprises:

a requesting user account identifier;

a requesting mobile device identifier, the requesting mobile device identifier associated with and obtained from a requesting mobile device;

a requesting peripheral device identifier, the requesting peripheral device identifier communicated from the peripheral device communicatively coupled to the mobile device;

a first requesting user credential; and a second requesting user credential, the second requesting user credential comprising requesting user input data, the requesting user input data captured by a requesting sensor associated with the requesting mobile device;

and a processor communicatively coupled to the memory, the memory including executable instructions that upon execution cause the system to:

compare the requesting user account identifier to the user account identifier;

compare the requesting mobile device identifier to the mobile device identifier;

compare the requesting peripheral device identifier to the peripheral device identifier;

compare a hash of the first requesting user credential to a hash of the first user credential;

compare the second requesting user credential to the second user credential;

authenticate the requesting in response to determining that the requesting user account identifier matches the user account identifier, the requesting mobile device identifier matches the mobile device identifier, the requesting peripheral device identifier matches the peripheral device identifier; the hash of the first requesting user credential matches the hash of the first user credential, and the second requesting user credential matches the second user credential; and communicate a message to the payment terminal indicating that the requesting user is authenticated for a financial transaction in response to authenticating the requesting user.

8. The system of claim 7, wherein the sensor is a selected one of the following:

a retinal scanner;

a fingerprint scanner;

a motion sensor; or a vocal sensor.

9. The system of claim 7, wherein the sensor is a biometric device.

10. The system of claim 7, wherein the sensor is configured to detect a movement of the mobile device according to a spatial pattern.

11. The system of claim 7, wherein the user input data is a selected one of the following:

retinal scan data of the user;

fingerprint scan data of the user;

movement data of the mobile device; or vocal data of the user.

12. The system of claim 7, wherein the second user credential is associated with a geographical location of the mobile device.

* * * * *